(12) United States Patent
Choi et al.

(10) Patent No.: US 12,148,892 B2
(45) Date of Patent: Nov. 19, 2024

(54) METHOD FOR RECOVERING LITHIUM BATTERY CELL BY HEAT TREATMENT AND METHOD FOR MANUFACTURING LITHIUM BATTERY CELL COMPRISING THE SAME

(71) Applicant: LG Chem, Ltd., Seoul (KR)

(72) Inventors: Hyunjun Choi, Daejeon (KR); Youngdeok Kim, Daejeon (KR); Daesoo Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 726 days.

(21) Appl. No.: 17/274,974

(22) PCT Filed: Jun. 25, 2020

(86) PCT No.: PCT/KR2020/008261
§ 371 (c)(1),
(2) Date: Mar. 10, 2021

(87) PCT Pub. No.: WO2021/033904
PCT Pub. Date: Feb. 25, 2021

(65) Prior Publication Data
US 2022/0158260 A1    May 19, 2022

(30) Foreign Application Priority Data

Aug. 19, 2019 (KR) .................. 10-2019-0101266

(51) Int. Cl.
*H01M 10/42* (2006.01)
*H01M 10/0525* (2010.01)

(52) U.S. Cl.
CPC ... *H01M 10/4242* (2013.01); *H01M 10/0525* (2013.01)

(58) Field of Classification Search
CPC .............. H01M 10/4242; H01M 10/0525
See application file for complete search history.

(56) References Cited

U.S. PATENT DOCUMENTS 11,735,726 B2 * 8/2023 Kaneda .................. C01G 53/42
429/223
2013/0115486 A1    5/2013 Saito et al.
(Continued)

FOREIGN PATENT DOCUMENTS

JP    H07263030 A    10/1995
JP    H10289729 A    10/1998
(Continued)

OTHER PUBLICATIONS

International Search Report for Application No. PCT/KR2020/008261 dated Oct. 7, 2020.
(Continued)

*Primary Examiner* — Christopher P Domone
*Assistant Examiner* — Jonathan William Estes
(74) *Attorney, Agent, or Firm* — Lerner David LLP

(57) ABSTRACT

The present disclosure relates to a method of recovering a degenerated lithium battery cell, with the lithium battery cell being configured so that an electrode assembly including a positive electrode, a negative electrode and a separator interposed therebetween is impregnated with a non-aqueous electrolyte and embedded in a battery case, the method including: subjecting a lithium battery cell degenerated by 5% or more to a high temperature treatment for 1 to 6 hours at a temperature ranging from 60° C. to 100° C. in a fully discharged state.

11 Claims, 4 Drawing Sheets

(56) References Cited

U.S. PATENT DOCUMENTS

| | | | |
|---|---|---|---|
| 2016/0020495 A1 | 1/2016 | Koba et al. | |
| 2018/0059192 A1 | 3/2018 | Seo et al. | |
| 2018/0086215 A1 | 3/2018 | Yoo et al. | |
| 2018/0151926 A1* | 5/2018 | Takebayashi | H01M 10/4242 |
| 2018/0233770 A1 | 8/2018 | Ein-Eli et al. | |
| 2018/0292461 A1 | 10/2018 | Kim et al. | |
| 2019/0190089 A1* | 6/2019 | Isomura | H01M 10/4242 |
| 2019/0356021 A1 | 11/2019 | Lim et al. | |
| 2020/0119407 A1 | 4/2020 | Hong et al. | |
| 2021/0328254 A1 | 10/2021 | Choi et al. | |

FOREIGN PATENT DOCUMENTS

| | | | |
|---|---|---|---|
| JP | 2012028024 A * | 2/2012 | |
| JP | 2012195161 A | 10/2012 | |
| JP | 2014207151 A | 10/2014 | |
| JP | 2016126912 A | 7/2016 | |
| JP | 2018092748 A | 6/2018 | |
| JP | 2018523276 A | 8/2018 | |
| KR | 20070082379 A | 8/2007 | |
| KR | 101445504 B1 | 9/2014 | |
| KR | 20150015417 A | 2/2015 | |
| KR | 20170021630 A | 2/2017 | |
| KR | 20180000605 A | 1/2018 | |
| KR | 20180106971 A | 10/2018 | |
| KR | 101903225 B1 | 11/2018 | |
| KR | 101987528 B1 | 6/2019 | |
| WO | 2019132403 A1 | 7/2019 | |
| WO | 2020251165 A1 | 12/2020 | |

OTHER PUBLICATIONS

Extended European Search Report including Written Opinion for Application No. 20851401.8 dated Nov. 2, 2021, pp. 1-7.

* cited by examiner

[FIG. 1]
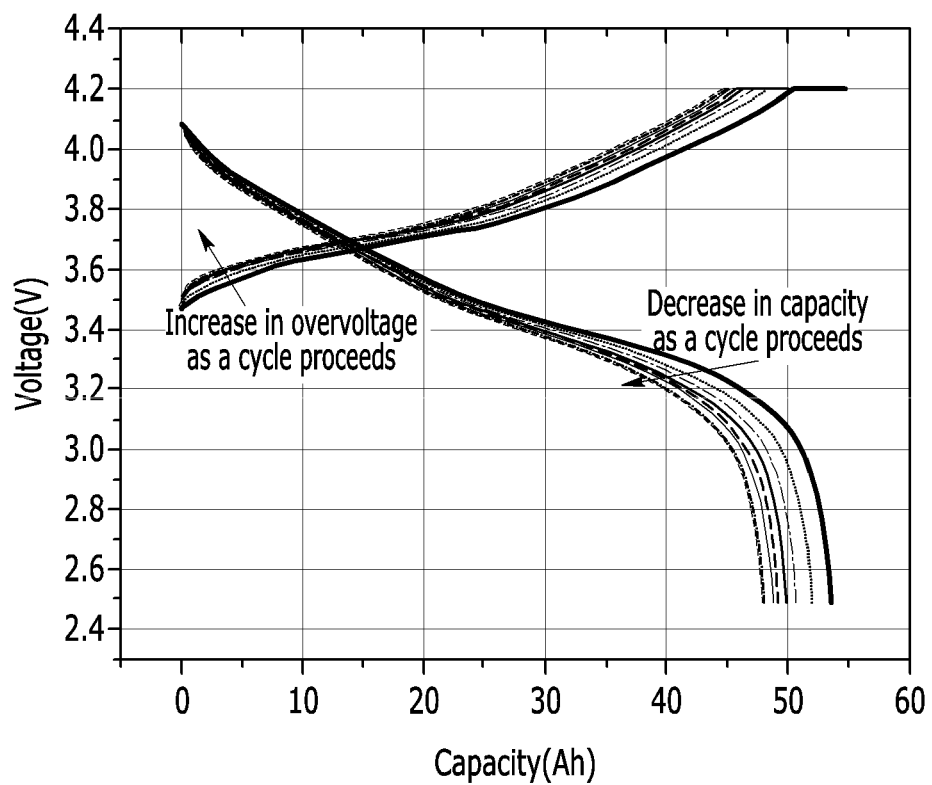

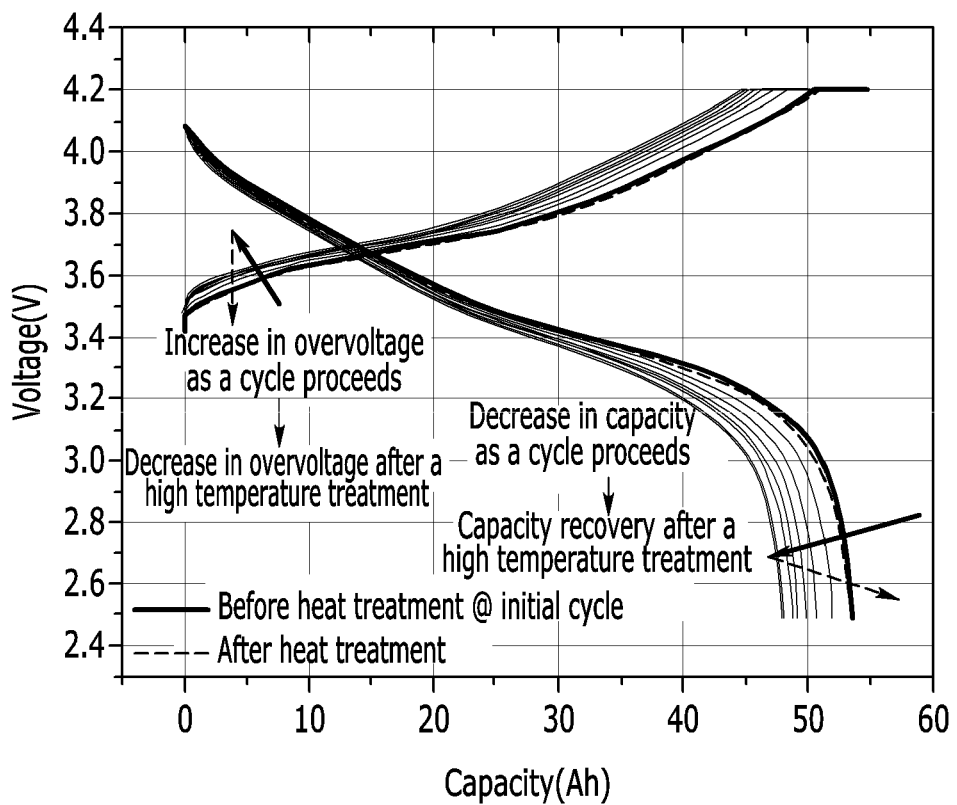
[FIG. 2]

[FIG. 3]
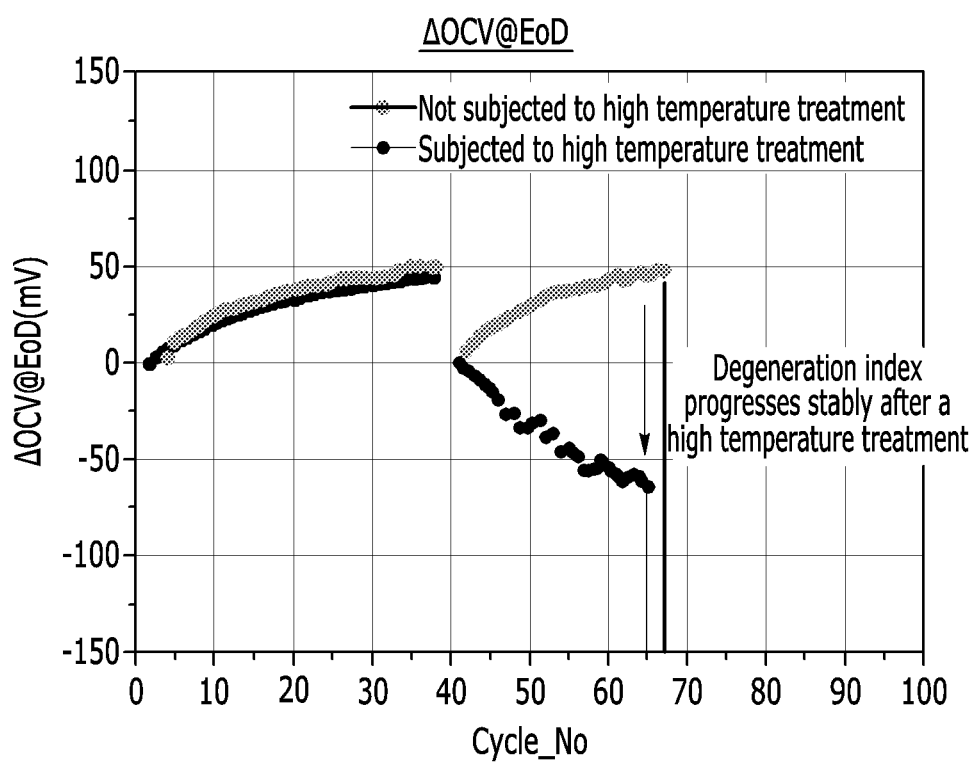

[FIG. 4]
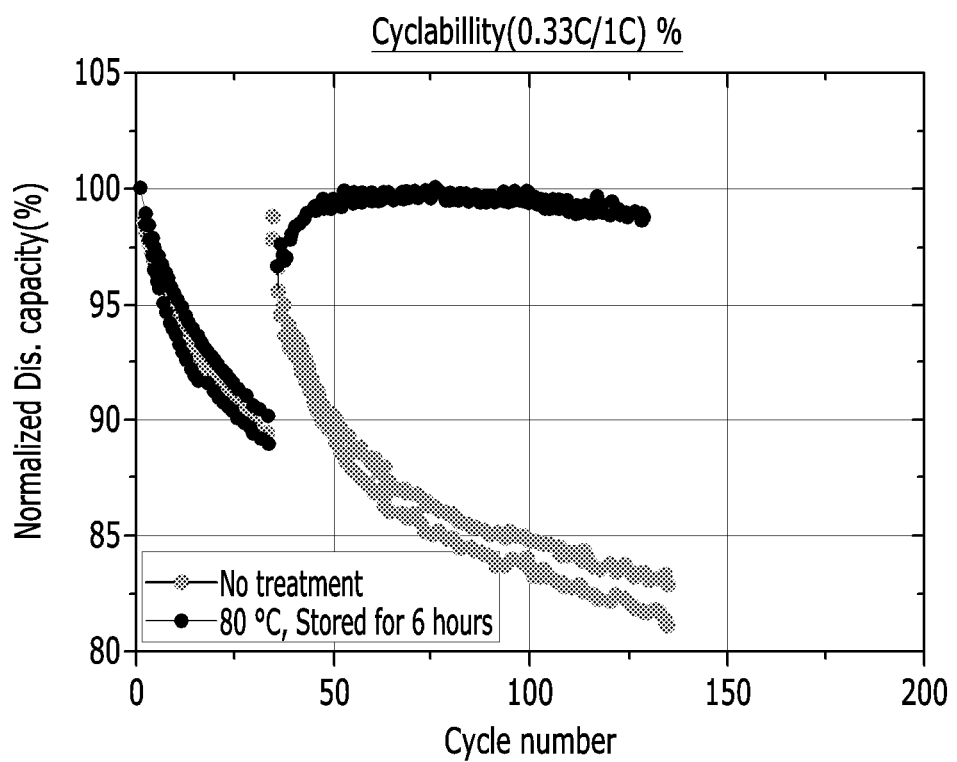

METHOD FOR RECOVERING LITHIUM BATTERY CELL BY HEAT TREATMENT AND METHOD FOR MANUFACTURING LITHIUM BATTERY CELL COMPRISING THE SAME

CROSS-REFERENCE TO RELATED APPLICATIONS

The present application is a national phase entry under 35 U.S.C. § 371 of International Application No. PCT/KR2020/008261, filed on Jun. 25, 2020, which claims priority to Korean Patent Application No. 10-2019-0101266, filed on Aug. 19, 2019, the disclosures of which are incorporated herein by reference in their entirety.

TECHNICAL FIELD

The present disclosure relates to a method of recovering a lithium battery cell by heat treatment, and a method of manufacturing a lithium battery cell including the same.

BACKGROUND ART

Recently, interests on energy storage technologies are more increased. As the energy storage technologies are extended to cellular phones, camcorders and notebook PC, and further to electric vehicles, the demand for high-energy concentration of a battery used as a power source of such an electronic device is increased. A lithium ion secondary battery is a battery that can best meet these needs, and many studies are now in active progress.

Basically, the secondary battery has a structure in which an electrode assembly is sealed in a battery case together with an electrolyte. Here, the electrode assembly includes a positive electrode, a negative electrode, and a separator interposed between the positive electrode and the negative electrode to electrically insulate the positive electrode and the negative electrode.

The lifetime performance of the secondary battery having the above-mentioned structure is gradually deteriorated as the cycle progresses. The reasons for such degeneration in the lifetime performance include largely degeneration due to a loss in negative electrode capacity and degeneration due to a loss in positive electrode capacity.

Among these, in the degeneration due to the loss in negative electrode capacity, lithium plating (Li-plating) occurs as the cycle proceeds, which accelerates the cycle degeneration.

In particular, when the cycle proceeds at a fast C-rate, the capacity rapidly decreases as the cycle progresses, resulting in degeneration. In this case, the greatest factor of degeneration is lithium plating at the negative electrode generated from the center.

In order to solve the above problems, conventionally, studies have been conducted on a method of preventing the problem in manufacturing the lithium battery cell by changing a positive electrode active material or a negative electrode active material, adjusting a N/P ratio, adding an additive, etc.

However, in this method, some capacity is lost, and there is also a limit to preventing the degeneration during the operation process.

Accordingly, there is a need for a technology capable of preventing the degeneration of the lithium battery cell for a long period of time without change in material or structure inside the battery cell.

DETAILED DESCRIPTION OF THE INVENTION

Technical Problem

The present disclosure has been designed to solve the above-mentioned problems and other technical problems that have yet to be resolved.

As a result of repeated in-depth studies and various experiments, the inventors of the present application have found that the lithium battery cell in which degeneration proceeds by 5% or more is subjected to a high temperature treatment, and the lithium plating is changed back to a reversible activation state, thus making it possible to recover a lifetime performance of a lithium battery cell, and have completed the present disclosure.

Technical Solution

Accordingly, the present disclosure provides a method of recovering a degenerated lithium battery cell, with the lithium battery cell being configured so that an electrode assembly including a positive electrode, a negative electrode and a separator interposed therebetween is impregnated with a non-aqueous electrolyte and embedded in a battery case, the method including: subjecting a lithium battery cell degenerated by 5% or more to a high temperature treatment for 1 to 6 hours at a temperature ranging from 60° C. to 100° C. in a fully discharged state.

Specifically, the high temperature treatment may be performed at a temperature ranging from 75° C. to 90° C. for 2 hours to 6 hours, more specifically at 80° C. for 6 hours.

If the high temperature treatment is performed at a too low temperature or for a too short period of time outside the above range, it is not enough to make the lithium plating reversibly active again, and thus, the capacity recovery property cannot be obtained. If the high temperature treatment is performed at a too high temperature or for a too long period of time, it is not preferable because it may affect other materials inside the lithium battery cell.

In the case of performing the high temperature treatment on the lithium battery cell partially degenerated as the cycle proceeds as described above, when the cycle proceeds again, a discharge capacity can be recovered to 98% or more of a discharge capacity which appears from the first charging and discharging, that is, an initial discharge capacity, and then, even during 100 cycles after the high temperature treatment, a capacity retention rate of 95% or more can be exhibited, thereby effectively preventing the degeneration.

Here, the capacity retention rate is based on a discharge capacity, and means a percentage of a nth discharge capacity expressed based on a first discharge capacity, that is, an initial discharge capacity.

Therefore, according to the present disclosure, since it is not necessary to separately change an active material or to change a material such as an additive, no discharge capacity loss or additional problem occurs, and it is not structurally changed, so that it can exhibit an effect of effectively recovering the lifetime property while maintaining a desired volume and size.

In the lithium battery cell degenerated by 5% or more, the degree of degeneration is calculated from a capacity reduction ratio based on an initial discharge capacity, when certain conditions are set and charging and discharging are repeatedly performed.

In other words, in the case of performing several times the process of: CC charging the lithium battery cell at a specific C-rate until it reaches a set voltage, fully charging it by performing CV charge so that the voltage is maintained if the set voltage is reached, and then completely discharging it by performing CC discharge at a specific C-rate until it reaches a set voltage, it can be calculated from the nth discharge capacity as the cycles proceed when the discharge capacity of the first cycle is designated as the initial capacity and the initial discharge capacity is 100%.

This degeneration rate can be expressed by Conditional Formula 1 below:

Degeneration rate ($x$ %)=(Initial discharge capacity−$n$ cycle discharge capacity)/(Initial discharge capacity)×100≥5 wherein, n is an integer of 2 or more.

Regardless of the charging and discharging under a specific condition, a charging and discharging cycle is proceeded, and the lithium battery cell satisfying the degeneration rate of Conditional Formula 1 can be subjected to a high temperature treatment according to the present disclosure.

In addition, in this case, the high temperature treatment is performed when the lithium battery cell is completely discharged.

Here, the complete discharge means a case where the SOC is 0 to 1, and specifically a case of being discharged to SOC 0, wherein the SOC 0 is a concept including an error range which generally occurs when charging and discharging a battery cell.

Similarly, the full charge refers to a case where the SOC is 99 to 100, and specifically a case of being charged to SOC 100, wherein the SOC 100 is a concept including an error range which generally occurs when charging and discharging a battery cell.

More specifically, the degeneration rate of the lithium battery cell subjected to the high temperature treatment may be 10% to 50%, particularly 10% to 15%.

If the high temperature treatment is performed on a lithium battery cell whose degeneration has not progressed too little outside the above range, the reduced capacity may be recovered, but when the cycle proceeds again, the degeneration proceeds not differently from the original degree of degeneration, and thus, the effect is insignificant.

Therefore, the high temperature treatment must be performed on the lithium battery cells in which the degeneration has progressed by 5% or more, specifically 10% or more, so that the lithium plating generated as the cycle proceeds becomes more than a predetermined amount, and thus, this lithium plating is brought back to a reversible activation state again, thereby increasing a degree of recovered life performance and lengthening the retention period.

On the other hand, in the case of a lithium battery cell which has undergone too much degeneration, there is a limit in the recovery even if the high temperature treatment is performed. Therefore, it is not preferable if the degeneration is greater than 50%.

Ultimately, the high temperature treatment induces a decrease in an open circuit voltage (OCV) at the end of the discharge and acts in a direction favorable to lifetime. This can be seen from Experimental Example 2 below.

Meanwhile, the present disclosure may also provide a method of manufacturing a lithium battery cell including the method of recovering a lithium battery cell as described above.

That is, the process of assembling the lithium battery cell and then proceeding a cycle and subjecting the lithium battery cell degenerated by 5% or more to high temperature treatment as described above may be a method of manufacturing a lithium battery cell. Specifically, the method of manufacturing a lithium battery cell may comprise the steps of:

(a) embedding an electrode assembly including a positive electrode, a negative electrode and a separator interposed therebetween into a battery case and impregnating it with a non-aqueous electrolyte to prepare a lithium battery cell;

(b) proceeding a cycle of the lithium battery cell; and (c) subjecting the lithium battery cell to a high temperature treatment at a temperature ranging from 60° C. to 100° C. for 1 to 6 hours in a fully discharged state, when the degeneration of the lithium battery cell in which the cycle proceeded has progressed by 5% or more.

Since the lithium battery cell manufactured as described above maintains excellent capacity for a long cycle even afterwards, it is possible to provide a lithium battery cell exhibiting excellent lifetime property, which more meets the needs of customers.

Hereinafter, the general configuration of the lithium battery cell of the present disclosure will be described in detail.

The positive electrode is manufactured by applying an electrode mixture, which is a mixture of a positive electrode active material, a conductive material and a binder, on a positive electrode current collector, and then drying it, and if necessary, a filler may be further added to the mixture.

The positive electrode active material may be, for example, a layered compound such as lithium cobalt oxide ($LiCoO_2$) or lithium nickel oxide ($LiNiO_2$) or a compound substituted with one or more transition metals; lithium manganese oxides such as chemical formula $Li_{1+x}Mn_{2-x}O_4$ (where, x is 0 to 0.33), $LiMnO_3$, $LiMn_2O_3$, $LiMnO_2$; lithium copper oxide ($Li_2CuO_2$); vanadium oxides such as $LiV_3O_8$, $LiFe_3O_4$, $V_2O_5$, and $Cu_2V_2O_7$; a Ni-site type lithium nickel oxide represented by chemical formula $LiNi_{1-x}M_xO_2$ (where, M=Co, Mn, Al, Cu, Fe, Mg, B or Ga, and x=0.01 to 0.3); lithium manganese composite oxide represented by chemical formula $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn); $LiMn_2O_4$ with a Li portion of chemical formula substituted with an alkaline earth metal ion; a disulfide compound; $Fe_2(MoO_4)_3$, and the like, but is not limited thereto. The positive electrode current collector is typically formed to a thickness of 3 to 500 μm. The positive electrode current collector is not particularly limited as long as a corresponding battery has high conductivity while a chemical change is not caused in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The conductive material is typically added in an amount of 1 to 30% by weight based on the total weight of the mixture containing the positive electrode active material. The conductive material is not particularly limited as long as a corresponding battery has high conductivity while a chemical change is not caused in the battery, and for example, graphite such as natural graphite and artificial graphite; carbon blacks such as carbon black, acetylene black, ketjen black, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used. Specific examples of a commercially available conductive material may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The binder is a component that assists in the binding between the active material and the conductive material and in the binding with the current collector, wherein the binder may typically be added in an amount of 1 to 30% by weight based on the total weight of the mixture containing the positive electrode material. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluorine rubber, various copolymers, and the like.

The filler may be optionally used as a component for suppressing expansion of a positive electrode, and is not particularly limited as long as the filler is a fibrous material while a chemical change is not caused in the battery. For example, olefinic polymers such as polyethylene and polypropylene, and fibrous materials such as glass fibers and carbon fibers are used.

The negative electrode is manufactured by coating, drying and pressing the negative electrode active material onto a negative electrode current collector, and if necessary, may optionally and further include the above-mentioned conductive material, binder, filler and the like.

The negative electrode active material may include one or more carbon-based materials selected from the group consisting of artificial crystalline graphite, natural crystalline graphite, amorphous hard carbon, low-crystalline soft carbon, carbon black, acetylene black, Ketjen black, Super-P, graphene and fibrous carbon, Si-based materials, metal composite oxides such as $Li_xFe_2O_3 (0 \leq x \leq 1)$, $Li_xWO_2$ $(0 \leq x \leq 1)$, $Sn_xMe_{1-x}Me'_yO_z$ (Me: Mn, Fe, Pb, Ge; Me': Al, B, P, Si, Group 1, 2, 3 elements in the periodic table, halogen; $0 < x \leq 1$; $1 \leq y \leq 3$; $1 \leq z \leq 8$); lithium metals; lithium alloys; silicon-based alloys; tin-based alloys; metal-based oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, $Bi_2O_5$; a conductive polymer such as polyacetylene; Li—Co—Ni based materials; titanium oxide; lithium titanium oxide, and the like, but are not limited thereto.

The negative electrode current collector is typically formed to a thickness of 3 to 500 μm. The negative electrode current collector is not particularly limited as long as a corresponding battery has high conductivity while a chemical change is not caused in the battery, and for example, may be formed of copper, stainless steel, aluminum, nickel, titanium, or baked carbon, or a material formed by surface-treating g a surface of copper or stainless steel with carbon, nickel, titanium, silver, or the like, or may use an aluminum-cadmium alloy or the like. In addition. similar to the positive electrode current collector, the negative electrode current collector may have fine protrusions and depressions formed on a surface thereof to enhance adherence of a negative electrode active material, and may be formed in various forms such as a film, a sheet, a foil, a net, a porous body, a foaming body, and a non-woven fabric structure.

The separator is preferably interposed between the negative electrode and the positive electrode. As the separator, an insulating thin film having high ion permeability and mechanical strength is used. The separator typically has a pore diameter of 0.01 to 10 μm and a thickness of 5 to 300 As the separator, sheets or non-woven fabrics made of an olefin-based polymer such as polypropylene; glass fiber or polyethylene, which have chemical resistance and hydrophobicity, are used. When a solid electrolyte such as a polymer is employed as the electrolyte, the solid electrolyte may also serve as both the separator and electrolyte.

The electrode assembly having such a configuration may be a stack type electrode assembly in which layers are sequentially stacked in the order of a positive electrode/separator/negative electrode . . . , or a jelly-roll type electrode assembly having a structure wherein negative electrodes and positive electrodes are wound by interposing a separator therebetween, or a stack-folding type electrode assembly having a structure wherein bi-cells and and/or full cells are fabricated and wound into a separation film, as described above.

Meanwhile, the electrode assembly manufactured as described above is housed in a battery case together with a non-aqueous electrolyte, and is impregnated with the non-aqueous electrolyte.

The non-aqueous electrolyte is composed of a liquid electrolyte and a lithium salt, and a non-aqueous organic solvent is used as the liquid electrolyte.

As examples of the non-aqueous organic solvent, mention may be made of non-protic organic solvents, such as N-methyl-2-pyrollidinone, propylene carbonate, ethylene carbonate, butylene carbonate, dimethyl carbonate, diethyl carbonate, gamma-butyro lactone, 1,2-dimethoxy ethane, tetrahydroxyfuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, and ethyl propionate.

The lithium salt is a material that is readily soluble in the above-mentioned non-aqueous electrolyte. The lithium salt may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate, and imide.

In addition, in order to improve charge and discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, or the like may be added to the electrolyte. In some cases, in order to impart incombustibility, the electrolyte may further include halogen-containing solvents, such as carbon tetrachloride and ethylene trifluoride. Furthermore, in order to improve high-temperature retention characteristics, the electrolyte may further include carbon dioxide gas. In addition, it may further include fluoro-ethylene carbonate (FEC), propene sultone (PRS), fluoro-ethylene carbonate (FEC), and the like.

The battery case may be a pouch type made of a lamination sheet including an inner sealant layer/metal layer/outer covering layer, a prismatic or cylindrical metal case made of metal.

BRIEF DESCRIPTION OF THE DRAWINGS

FIG. 1 is a graph showing an increase in overvoltage and a decrease in capacity as a cycle proceeds according to Reference Example 1.

FIG. 2 is a graph showing a decrease in overvoltage and capacity recovery when a high temperature treatment is performed according to Example 1 after a cycle according to Experimental Example 1 proceeds.

FIG. 3 is a graph showing a change in OCV according to cycles in Experimental Example 2.

FIG. 4 is a graph showing a capacity retention rate according to cycles in Experimental Example 3.

DETAILED DESCRIPTION OF THE EMBODIMENTS

Hereinafter, the present disclosure will be described in more detail through examples, but the following examples are for illustrative purposes only, and the scope of the present disclosure is not limited thereto.

Preparation Example

Manufacture of Positive Electrode $0.5Li_2MnO_{3.5}Li(Ni_{0.45}Mn_{0.35}Ni_{0.20})O_2$ was used as the positive electrode active material, and the conductive material (carbon black) and the binder (PVdF) were added in a weight ratio of 90:5:4 to NMP(N-methyl-2-pyrrolidone), and mixed to prepare a positive electrode mixture.

The prepared positive electrode mixture was coated onto a 20 μm thick aluminum foil to a thickness of 80 μm, then rolled and dried to manufacture a positive electrode.

Manufacture of Negative Electrode

Artificial graphite was used as the positive electrode, and the conductive material (carbon black), the conductive material (carbon black) and the binder (PVdF) were added in a weight ratio of 95:3:2 to NMP(N-methyl-2-pyrrolidone) and mixed to prepare a negative electrode mixture.

The prepared negative electrode mixture was coated onto a 20 μm thick copper foil to a thickness of 80 μm, then rolled and dried to manufacture a negative electrode.

Manufacture of Battery Cell

A separator (DB0901, BA1 SRS composition, thickness: 18 μm, cloth 9 μm, total coating thickness of 9 μm, coated to a thickness of 4.5 μm per one surface of SRS) was interposed between the positive electrode and the negative electrode, and laminated at a linear pressure of 1 kgf/mm to manufacture an electrode assembly. The electrode assembly was then housed in a pouch-type battery case, and a non-aqueous electrolyte, in which ethyl carbonate, dimethyl carbonate, and ethyl methyl carbonate were mixed at a volume ratio of 1:1:1 and a non-aqueous electrolyte solution containing 1M $LiPF_6$ as a lithium salt was contained as lithium salt, was added thereto to manufacture a pouch type lithium secondary battery cell.

Reference Example 1

The process of charging the lithium battery cell prepared in Preparation Example to 4.2V at 0.33C and discharging it to 2.5V at 1.0C was repeated to measure the changes in capacity and voltage according to the proceeding of the cycle.

The results of proceeding the cycle up to 40 times are shown in FIG. 1 below.

Referring to FIG. 1, it can be seen that as the cycle proceeds, the changes in capacity and voltage move along an arrow direction, so that the overvoltage increases and the capacity decreases.

Example 1

The discharge capacity was measured with a charging/discharging device from the PNE Company while repeating the process of charging the lithium battery cell prepared in the preparation example to 4.2V at 0.33C in a 25° C. chamber and discharging it to 2.5V at 1.0C. When the discharge capacity reached about 90% of an initial discharge capacity (degeneration rate: 10%, 40 cycles), the cycle was stopped. The battery cell was subjected to a high temperature treatment at 80° C. for 6 hours in a state of SOC 0.

Experimental Example 1

The process of charging the battery cell subjected to the high temperature treatment in Example 1 to 4.2V at 0.33C and discharging it to 2.5V at 1.0C was repeated once to measure the changes in capacity and voltage, and the results are shown in FIG. 2.

Referring to FIG. 2, it can be seen that almost the same aspect as the initial capacity and voltage was exhibited by the high temperature treatment.

In order to more clearly show the recovery due to the high temperature treatment, the voltage increase and the capacity decrease according to the cycle before the high temperature treatment were indicated in gray.

Comparative Examples 1 to 2 and Examples 2 to 3

Four lithium battery cells prepared in Preparation Examples were prepared The discharge capacity was measured with a charging/discharging device (PNE Company) while repeating the process of charging the lithium battery cell to 4.2V at 0.33C in a 25° C. chamber and discharging it to 2.5V at 1.0C. When the discharge capacity reached about 90% of the initial discharge capacity (degeneration rate: 10%, 40 cycles), the cycle was stopped. Two of the lithium battery cells were stored at 25° C. for 6 hours in the state of SOC 0, the other two were subjected to the high temperature treatment (stored) at 80° C. for 6 hours.

Experimental Example 2

The process of charging the lithium battery cells of Comparative Examples 1 to 2 and Examples 2 to 3 to 4.2V at 0.33C and discharging them to 2.5V at 1.0C was repeated again.

While discharging the battery cells of Comparative Examples 1 to 2 and Examples 2 to 3 from the beginning to the time when the discharge capacity become about 90% of the initial discharge capacity (degeneration rate: 10%, 40 cycles), each cycle had a rest time at which electricity was not allowed to flow when the discharge completed the corresponding cut-off discharge CV section (about 30 minutes). The difference of the OCV values in the last 30 minutes immediately after the discharge was completed was measured as a delta value, and then, the difference of the OCV values during the rest time according to the proceeding of the cycle after the storage or high temperature treatment was measured as a delta value. The results were shown in FIG. 3 below.

In this case, an increase in the difference of the OCV values, i.e. the delta value indicates that so much overvoltage was applied and solved during the rest time, and thus, it is stable to go in a decreasing direction.

Meanwhile, in the figure, each graph of the Comparative Examples and the Examples is overlapped and it appears as a single graph.

Referring to FIG. 3, it can be seen that the lithium battery cell of Example 1 subjected to the high temperature treatment induces a decrease in the OCV after the high temperature treatment and proceeds stably, whereas the lithium battery cell of Comparative Example 1 not subjected to the high temperature treatment exhibits a form of degeneration progression in which the OCV increases.

Experimental Example 3

The process of charging the lithium battery cells of Comparative Examples 1 to 2 and Examples 2 to 3 to 4.2V at 0.33C and discharging them to 2.5V at 1.0C was repeated again.

The capacity retention rate according to the cycle before and after the treatment of the lithium battery cells of Comparative Examples 1~2 and Examples 2~3 was measured from the beginning (charging/discharging device manufactured by PNE company), and the results were shown in FIG. 4 below.

Referring to FIG. 4, it can be seen that the lithium battery cell of Example 1 subjected to the high temperature treatment recovered almost 98% or more of the capacity after the high temperature treatment, and then, this capacity was maintained at a capacity retention rate of 95% or more for 100 cycles or more (for 140 cycles or more in the graph), whereas the capacity retention rate of the lithium battery cell of Comparative Example 1 not subjected to the high temperature treatment was rapidly decreased.

Although the exemplary embodiments of the present disclosure have been disclosed for illustrative purposes, those skilled in the art will appreciate that various application and modifications can be made, without departing from the scope and spirit of the invention as disclosed in the accompanying claims.

The invention claimed is:

1. A method of recovering a degenerated lithium battery cell,
the method comprising:
subjecting a lithium battery cell degenerated by 5% or more to a high temperature treatment for 1 to 6 hours at a temperature within the range of 75° C. to 100° C. in a fully discharged state,
wherein the lithium battery cell comprises an electrode assembly including a positive electrode, a negative electrode and a separator interposed therebetween, which is impregnated with a non-aqueous electrolyte and embedded in a battery case, and
wherein the entire lithium battery cell is maintained at the temperature within the range of 75° C. to 100° C.

2. The method of claim 1, wherein the high temperature treatment is performed at a temperature ranging from 75° C. to 90° C. for 2 to 6 hours.

3. The method of claim 2, wherein the high temperature treatment is performed at 80° C. for 6 hours.

4. The method of claim 1, wherein the degeneration of the lithium battery cell is calculated from a capacity reduction ratio based on an initial discharge capacity when charging and discharging are repeatedly performed.

5. The method of claim 1, wherein the lithium battery cell to be subjected to the high temperature treatment is a lithium battery cell which satisfies the following Conditional Formula 1:

$$\text{Degeneration rate } (x\,\%) = (\text{Initial discharge capacity} - n \text{ cycle discharge capacity})/(\text{Initial discharge capacity}) \times 100 \geq 5$$

wherein n is an integer of 2 or more.

6. The method of claim 1, wherein a fully discharged state is SOC 0 to 1.

7. The method of claim 5, wherein the lithium battery cell subjected to the high temperature treatment has a degeneration rate of 10% to 50%.

8. The method of claim 5, wherein the lithium battery cell subjected to the high temperature treatment has a degeneration rate of 10% to 15%.

9. The method of claim 1, wherein the lithium battery cell subjected to the high temperature treatment recovers a capacity to 98% or more of a discharge capacity as a result of a first charging and discharging.

10. The method of claim 1, wherein the lithium battery cell subjected to the high temperature treatment exhibits a capacity retention rate of 95% or more for 100 cycles after the high temperature treatment.

11. A manufacturing method of a lithium battery cell comprising the method of recovering a lithium battery cell according to claim 1, the manufacturing method comprising the steps of:
(a) embedding the electrode assembly including the positive electrode, the negative electrode and the separator interposed therebetween into a battery case and impregnating it with the non-aqueous electrolyte to prepare the lithium battery cell;
(b) proceeding a cycle of the lithium battery cell; and
(c) subjecting the lithium battery cell to the high temperature treatment at the temperature ranging from 60° C. to 100° C. for 1 to 6 hours in the fully discharged state, when the degeneration of the lithium battery cell in which the cycle proceeded has progressed by 5% or more.

* * * * *